Patented Mar. 28, 1933

1,902,986

UNITED STATES PATENT OFFICE

MAURICE E. BARKER, OF EDGEWOOD ARSENAL, MARYLAND

PROCESS OF PRODUCING ACTIVATED CHARCOAL FROM CHARCOAL FINES

No Drawing.    Application filed December 22, 1930. Serial No. 504,205.

(GRANTED UNDER THE ACT OF MARCH 3, 1883, AS AMENDED APRIL 30, 1928; 370 O. G. 757)

This invention described herein may be manufactured and used by or for the Government for Government purposes, without payment to me of any royalty thereon.

The present invention relates to charcoal and more particularly to an improved process for preparing a highly active adsorbent charcoal and to the substance itself.

In the past, it has been customary to produce active charcoal by several different processes and combinations thereof. For example, the art early discovered that the adsorbent properties of charcoal could be markedly increased by treating the charcoal with steam at a bright red heat. Since that time numerous improvements in processes for the preparation of active charcoal have occurred. However, in all processes devised up to the present, for the formation of activated charcoal, a very considerable wastage occurs through the formation of particles too small for use as gas adsorbent granules. Obviously, this loss results in lowering the efficiency of such processes and consequently increasing their operative expense.

Methods in which the charcoal forming substance has been initially impregnated with an acid, base, or salt, or any combination of these, have been characterized by the disadvantage that the finished material must be carefully washed to remove the excess minerals present therein. Still another disadvantage in charcoal formed in accordance with present methods is that its retentivity per unit volume and the mechanical strength of the granules are relatively low.

The major object of the invention is the provision of a method for preparing activated charcoal which lacks the inherent disadvantages of methods employed in the past.

An equally important object of the invention is the production of a highly active adsorbent charcoal.

Another object of the invention is the production of a material which, upon carbonization, will form a dense primary charcoal readily yielding to activation treatment.

Still another object of the invention is the provision of a process for forming a primary charcoal by treating a mixture of wood flour and charcoal fines with a liquid containing carbonaceous material and a dehydrating fireproofing chemical, forming the mass into billets or briquettes and carbonizing the material.

Yet another object of the invention is the provision of a method for forming a primary charcoal suitable for activation by carbonizing carbonaceous material, impregnated with a dehydrating agent, the carbonizing being carried out by heat treatment of the material in a stream of flue gas which is free from carbon monoxide, enriched by carbon dioxide, and has a low oxygen content.

A further object of the invention is the provision of a process for activating primary charcoal by the simultaneous action of a dehydrating agent and a stream of inert gas, the charcoal being maintained at elevated temperatures.

Yet a further object of the invention is the provision of a process for activating primary charcoal wherein the charcoal after partial activation, carried out at elevated temperatures, is subsequently subjected to heat treatment at higher temperatures, this latter treatment being carried out for relative short periods of time in an atmosphere of an inert gas, after which heat treatment the charcoal is allowed to cool in a non-oxidizing atmosphere.

Still a further object of the invention is the provision of a process for activating primary charcoal, the primary charcoal being in the form of briquettes, after partial activation of which they are broken up and screened, certain of the fines being returned to the initial stage of the process for forming the primary charcoal, and the remaining coarse particles further treated to complete activation.

A still further object of the invention is the provision of a process for the formation of activated charcoal from primary charcoal in the form of billets, the billets after partial activation being further heat treated to complete their activation, after which they are then broken into small particles, screened, and certain of the fines returned to the initial stage of the process for forming primary charcoal.

With these and other objects in view which may be incident to my improvements, the invention consists in the method to be herein set forth and claimed, with the understanding that the several necessary steps comprising the invention may be accomplished in any order found most suitable for carrying the same into practical effect, without departing from the spirit of the invention and the scope of the appended claims.

The invention comprehends the provision of a process for the production of a highly active adsorbent charcoal from primary charcoal. One method of practically effecting the concept of the invention is the formation of the primary charcoal in the form of billets from a mixture of charcoal fines and wood flour treated with a liquid containing carbonaceous material and a dehydrating fireproofing agent, this mixture being heated and pressed into billets, after which it is suitably carbonized by heat treatment to form primary charcoal.

The invention also comprehends the partial activation of billets formed as noted above, by further treating them at elevated temperatures in an atmosphere of a flue gas. After such treatment, the billets may be crushed and screened, certain of the fines being returned to the initial stage for the preparation of primary charcoal, while the remainder of the particles are again treated at high temperatures for short periods of time so as to insure complete activation. However, if desired, the billets immediately after partial activation may be treated at highly elevated temperatures and then crushed and screened. After complete activation, a highly active adsorbent charcoal is obtained which generally is ready for immediate use.

To be noted is the fact that the usefulness of charcoal depends upon several factors, particularly upon the total retentivity per unit volume of charcoal, and the mechanical strength of the granules. The retentivity, in turn, depends upon the activation imparted to the material, and the total pore volume in which condensation or adsorption can occur. Accordingly, a hard strong granule having an apparent density of about 0.5 and total retentivity for chlorpicrin when measured at 0.01 mm. of mercury pressure at 25° C. of at least 40% of the weight of the dry charcoal is highly desirable. With this point in view, the process forming the subject matter of the invention will be outlined.

In carrying out my process, I mix charcoal fines and wood flour in substantially equal proportions by volume. Preferably wood flour formed from hard wood such as oak, beech or maple, is employed. The mixture of wood flour and charcoal, just described, is thoroughly wetted by a solution containing about 25% by weight of zinc chloride, 5% hydrochloric acid, and from 25 to 50% of a soluble carbonaceous substance. Suitable carbonaceous substances include sugar, glucose and waste sulphite liquor.

The wetted mixture of wood flour and charcoal fines is then heated for about twenty-four hours at a temperature of from 85 to 100° C., during which time the wood and soluble carbonaceous material are partly carbonized due to the dehydrating action of the zinc chloride. After heating, the mass is briquetted into blocks by placing the substance under high pressure.

Of course, the size of the blocks may be varied if desired, as well as the pressure employed in forming them. With the variation of the latter, however, it will be appreciated that the density of each block will be affected. I have, however, had considerable success with blocks of about two inches square, formed under a pressure of about twenty thousand pounds per square inch. It is to be understood, however, that the charcoal may be briquetted into other sizes of blocks by the use of either corresponding or different pressures without departing from the spirit of the invention or the scope of the claims appended hereto.

Having formed the briquettes in the manner just indicated, they are then placed in a furnace and are completely carbonized by heating at a slowly increased temperature up to approximately 450° C., while a stream of flue gas is passed through the kiln so as to preferably maintain a very slight positive pressure within the interior thereof. It is to be noted that the flue gas, just mentioned is, before being passed through the kiln enriched by carbon dioxide to give an oxygen content of less than 5%. Such a flue gas preferably has a carbon dioxide content of from 25 to 50%.

By maintaining a low percentage of oxygen within the flue gas, oxidation of the charcoal being treated is substantially prevented. During the carbonizing period, the gases formed from carbonization are swept away and some addition of oxygen to the charcoal substance takes place which prevents the formation of gas carbon in later steps of the process. This is very desirable, because of the fact that gas carbon is not active, and it is, at least up to the present, substantially impossible to activate the same.

The carbonizing step just mentioned is continued for twenty-four hours under the foregoing conditions. At the end of such time, primary charcoal is considered to be formed which may be stored until needed or it may be further treated.

For further treatment of the primary charcoal, I proceed in the following manner. The billets, after carbonization, are heated for approximately from four to six hours at a temperature of from 700° C. to 800° C., while a slow stream of flue gas, such as that used in carbonizing, is passed at a slight positive pressure through the furnace or other heating apparatus. However, when carrying out this step, I can pass almost pure nitrogen through the furnace in order to use up the zinc chloride and the oxygen added during primary carbonization. Such treatment as that just outlined results in partial activation.

Having treated the carbon in the manner described, the billets or blocks may be broken up into small pieces and screened prior to complete activation. In the screening, particles that pass a standard 6-mesh screen and are retained on a 14-mesh screen, are saved for activating, the fines being returned for briquetting. Granules of the broken blocks which pass the 6-mesh screen and are retained on a 10-mesh screen are activated together, while the particles that pass a 10-mesh screen and are held on a 14-mesh screen, are activated separately. The separation of the different sized particles is for the purpose of attaining a more even activation.

Further activation of the charcoal is carried out by taking the particles retained on the sieves, as mentioned above, and heating them in a stream of superheated flue gas rich in carbon dioxide and containing less than 5% oxygen at a temperature of from 800 to 950° C. for approximately two hours. During this period, the last of the zinc chloride is broken down, forming zinc and zinc oxide, while the chlorinated hydrocarbon compounds are eliminated. Some of the zinc is distilled out by reduction with the hydrocarbons present. In addition, the portions of the granule containing the most hydrocarbons react with carbon dioxide to form a homogeneous mass of active carbon. About 2% to 3% of zinc remains in the granule at the end of this treatment. The charcoal is now ready for use without washing or further treatment except that it must be cooled out of contact with air to prevent oxidation.

It will be appreciated that the process outlined may be varied so that certain steps therein may be interchanged for others. For example, after heating the billets of the primary charcoal from 700 to 800° C. for about six hours, instead of crushing them they may be placed directly in a furnace maintained at approximately 1000° C. by passing therethrough an inert gas such as substantially pure nitrogen or a flue gas mixture of the character described, for a period of time of about two hours. After this treatment, the billets are cooled in a manner like that mentioned above, for example, by passing a flue gas mixture similar to that described, through the hot mass. This charcoal, after cooling, is next broken up into granules of the desired size, and is screened as previously pointed out, certain of the fines being returned in the initial step for forming primary charcoal, while the remainder or coarse particles are ready for use as an adsorbent.

The effects of the different temperatures in the different stages of the process will be appreciated from the following. For example, during the heating of the carbon for from four to six hours at about 700 to 800° C., elimination of most of the hydrocarbons in the primary charcoal is obtained, and in addition an increase in the density, hardness and toughness is procured, while at the same time, the heating effects the partial chlorination of the remaining hydrocarbons. Some of the zinc chloride, it may be noted, is also distilled out.

During either activation step, that is, before or after crushing the billets, the heat treatment of the charcoal which is carried out at high temperatures, results in a marked hardening of the granules, a shrinkage in volume, and an increase in density, as well as a marked increase in the activation of the charcoal due to the reaction of zinc oxide remaining with the hydrocarbons in the charcoal. The prolonged heating at high temperatures is to be avoided, as this results in graphitizing the charcoal, with a consequent reduction in activation. By cooling the carbon in a stream of flue gas, some increased activation is obtained. At the same time, however, the flue gas is preheated, and may be used in other steps of the process. Moreover, cooling of the activated carbon in such an inert gas as that described, prevents its oxidation, as it is cooled out of contact with air.

Generally speaking, the carbon after activation, as previously outlined, is ready for immediate use. However, in some instances, when the charcoal is desired in an exceptionally free state from minerals for use in liquids, washing may be employed. This procedure, when followed, can employ standard countercurrent washing or extraction using any well known system.

While I have outlined the use of zinc chloride, which functions as a dehydrating as well as fireproofing agent, it is to be understood that other substances may be employed therefor. For example, I have found that phosphoric acid, sulphuric acid, and cadmium chloride may also be employed, in fact it may be generally said that any dehydrating agent is useful for this purpose.

However, zinc chloride and sugar in a weak hydrochloric acid solution are preferred since the zinc chloride is a powerful dehydrating and fireproofing material. The addition of sugar increases the density of the particle and acts as a binding material. Wood flour, it may be noted, also acts as a binder upon carbonization. The presence of charcoal in the briquette increases the density, while the addition of the dehydrating material increases the yield of charcoal from both the sugar and wood flour during primary carbonization. It may also be appreciated that the dehydrating material lowers the temperature at which carbonization takes place.

As previously pointed out, I have had success with carbonaceous substances which include sugar, glucose and waste sulphite liquor. However, it is to be understood that other and similar substances may be employed without departing from the spirit of the invention and the scope of the appended claims.

The quantities of all constituents and the pressure of briquetting can be varied to give the desired density to the finished product. Granules that pass a standard 10-mesh screen and are held on a 12-mesh screen should have an apparent density, when well shaken down, of from 0.30 to 0.5 for gas adsorbents and from 0.2 to 0.30 for color adsorbents. Other things being equal the retentivity of gases adsorbed increases as the density increases.

For many purposes, a very dense charcoal is desired, such for example, as gas mask canisters, as well as in many other instances. It will be appreciated that a highly activated charcoal of such a nature may be obtained in accordance with the method which I have described.

By the process which I have outlined, I have been enabled to obtain activated charcoal, which meets in all respects, the specifications outlined for an ideal charcoal. Not only have I devised a process capable of producing charcoal of such nature, but one in which the waste is exceedingly small and consequently the expense of the finished product relatively low.

In addition to this, it will be appreciated that the method outlined in the foregoing is simple to carry out and the materials used therein are of inexpensive nature, some being waste products themselves. It should also be noted that in carrying out the process for the activation of charcoal, the apparatus needed therefor will be of simple construction and design and of no special character.

While I have shown and described the preferred embodiment of my invention, I wish it to be understood that I do not confine myself to the precise details herein set forth, as it is apparent that many changes and variations may be made therein by those skilled in the art, without departing from the spirit of the invention or exceeding the scope of the appended claims.

I claim:

1. A process for forming primary charcoal comprising wetting a mixture of charcoal fines and wood flour with an acid solution containing a dehydrating agent and carbonaceous material, drying the wetted mass, compressing the mass into briquettes, and heating the briquettes until thoroughly carbonized.

2. A process for forming primary charcoal comprising wetting a mixture of charcoal fines and wood flour with an acid solution containing a dehydrating agent, and carbonaceous material, drying the wetted mass, compressing the mass into briquettes, and heating the briquettes until thoroughly carbonized at a slowly ascending temperature up to approximately 450° C.

3. A process for forming primary charcoal comprising wetting a mixture of charcoal fines and wood flour with a solution containing a dehydrating agent and carbonaceous material, compressing the mass into briquettes, and heating the briquettes until thoroughly carbonized in a stream of flue gas enriched with carbon dioxide and having an oxygen content of less than 5% until the briquettes are thoroughly carbonized.

4. A process for producing primary charcoal comprising wetting a mixture of charcoal fines and wood flour with a solution containing zinc chloride, a small amount of hydrochloric acid, and a carbonaceous material, drying the wetted mass, compressing the treated mass into briquettes, and heating the briquettes until thoroughly carbonized.

5. A process for forming primary charcoal comprising wetting a mixture of charcoal fines and wood flour in substantially equal proportions with a solution containing zinc chloride, a small amount of hydrochloric acid, and a carbonaceous material, drying the wetted mass, compressing the treated mass into briquettes, and heating the briquettes until thoroughly carbonized.

6. A process for forming primary charcoal comprising wetting a mixture of charcoal fines and wood flour in substantially equal proportions with a solution containing about 25% by weight of zinc chloride, a small amount of hydrochloric acid, and from about 25% to 50% of a carbonaceous material, drying the wetted mass, compressing the treated mass into briquettes, and heating the briquettes until thoroughly carbonized.

7. A process for forming primary charcoal comprising wetting a mixture of charcoal fines and wood flour in substantially equal proportions with a solution containing 25% by weight of zinc chloride, a small amount of hydrochloric acid, and from about 25% to 50% of a carbonaceous material, heating the wetted mass for approximately twenty-four hours at a temperature of around 85° to 100° C., compressing the mass into briquettes, and heating the briquettes in a stream of flue gas enriched with carbon dioxide and having an oxygen content of less than 5%, the heating to be carried out at a slowly increasing temperature up to around 450° C. until the briquettes are thoroughly carbonized.

8. In a process for activating a primary charcoal impregnated with a dehydrating agent, the steps of heating the charcoal from four to six hours at a temperature of from 700 to 800° C. in a stream of flue gas containing less than 5% of oxygen, completing activation of the charcoal by heating it at higher temperatures than 800° C. in a stream of flue gas rich in carbon dioxide containing less than 5% of oxygen, and cooling the charcoal out of contact with air.

9. In a process for activating a primary charcoal impregnated with a dehydrating agent, the charcoal being in the form of briquettes, the steps of partially activating the charcoal by heating at elevated temperatures in a stream of flue gas containing less than 5% of oxygen, crushing and screening the charcoal, and completing the activation of certain of the screened particles by heating in a stream of inert gas containing less than 5% of oxygen at a temperature ranging from that used in partial activation to higher temperatures.

10. In a process for activating a primary charcoal impregnated with a dehydrating agent, the charcoal being in the form of briquettes, the steps of partially activating the charcoal by heating for from four to six hours at a temperature of from 700° to 800° C. in a stream of flue gas containing less than 5% of oxygen, crushing and screening the charcoal, completing the activation of certain of the screened particles by heating for about two hours at a temperature of around 800° to 950° C. in a stream of inert gas containing less than 5% of oxygen.

11. In a process for activating a primary charcoal impregnated with a dehydrating agent, the charcoal being in the form of briquettes, the steps of partially activating the charcoal by heating for from four to six hours at a temperature of from 700° to 800° C. in a stream of flue gas rich in carbon dioxide containing less than 5% of oxygen, crushing the charcoal into particles and screening said particles, completing the activation of the particles that pass a 6-mesh screen and are retained on a 10-mesh screen and the particles that pass a 10-mesh screen and are retained on a 14-mesh screen by heating them for about two hours at a temperature of around 800° to 950° C. in a stream of inert gas containing less than 5% of oxygen.

12. In a process for activating a primary charcoal impregnated with a dehydrating agent, the charcoal being in the form of briquettes, the steps of partially activating the charcoal by heating for from four to six hours at a temperature of from 700° to 800° C. in a stream of flue gas rich in carbon dioxide containing less than 5% of oxygen, completing the activation of the charcoal by heating for about two hours at a temperature of about 1000° C. in a stream of inert gas, crushing and screening the charcoal, certain of the fines being employed for the formation of the primary charcoal, the remainder of the particles being ready for use as adsorptive charcoal.

13. In a process for activating a primary charcoal formed into briquettes from a mixture of charcoal fines and wood flour impregnated with a dehydrating agent, the steps of partially activating the charcoal by heating at elevated temperatures in a stream of flue gas, crushing and screening the charcoal, returning certain of the fines for mixing with the wood flour in the formation of the primary charcoal, and completing the activation of the remaining particles by heating in a stream of inert gas containing less than 5% of oxygen at a temperature higher than that used for partial activation.

14. A method of producing highly active adsorbent charcoal comprising the steps of wetting a mixture of charcoal fines and wood flour with a solution containing a dehydrating agent and carbonaceous material, drying the wetted mass, compressing the mass into briquettes, partially activating the briquettes by heating at elevated temperatures in a stream of flue gas, and completing activation of the briquettes by heating at a temperature ranging from that used in partial activation to higher temperature, the second heating step being carried out in a stream of inert gas, and cooling the activated charcoal out of contact with the atmosphere.

15. A process for producing highly active adsorbent charcoal comprising the steps of wetting a mixture of wood flour and charcoal fines in equal proportion with an acid solution containing a dehydrating agent and carbonaceous material, drying the wetted mass, compressing the mass into briquettes, partially activating the charcoal by heating for from four to six hours at a temperature of from 700° to 800° C. in a stream of flue gas rich in carbon dioxide containing less than 5% of oxygen, completing the activation of the charcoal by further heating at a temperature ranging from that used in the partial activation to higher temperatures in a stream of flue gas rich in carbon dioxide containing less than 5% of oxygen, and cooling the activated charcoal out of contact with the air by passing an inert gas therethrough.

16. A method of producing highly active adsorbent charcoal comprising the steps of wetting a mixture of charcoal fines and finely divided uncarbonized ligneous material with an acid solution containing a dehydrating agent and a carbonaceous binder, drying the wetted mass, compressing the mass into briquettes, partially activating the briquettes by heating at elevated temperatures in a stream of flue gas, and completing activation of the briquettes by heating at a temperature ranging from that used in partial activation to a higher temperature, the second heating step being carried out in a stream of inert gas, and cooling the activated charcoal out of contact with the atmosphere.

17. A process for forming primary charcoal comprising wetting a mixture of charcoal fines and wood flour in substantially equal proportions with a solution containing zinc chloride, a small amount of hydrochloric acid, and sugar, drying the wetted mass, compressing the treated mass into briquettes, and heating the briquettes until thoroughly carbonized.

18. A process for forming primary charcoal comprising wetting a mixture of charcoal fines and wood flour in substantially equal proportions with a solution containing about 25% by weight of zinc chloride, a small amount of hydrochloric acid, and from about 25% to 50% of sugar, drying the wetted mass, compressing the treated mass into briquettes, and heating the briquettes until thoroughly carbonized.

19. A method of producing highly active adsorbent charcoal comprising the steps of wetting a mixture of charcoal fines and wood flour with an acid solution containing a dehydrating agent and carbonaceous material, drying the wetted mass, compressing the mass into briquettes, heating the briquettes in a stream of flue gas, the heating to be carried out with an increasing temperature until the briquettes are thoroughly carbonized, partially activating the briquettes by heating at high temperatures in a stream of flue gas, crushing and screening the charcoal, returning certain of the fines for mixing with the wood flour in the formation of primary charcoal, and completing activation of the remaining particles by heating at a temperature ranging from that used in partial activation to higher temperatures, the last mentioned heating step being carried out in stream of inert gas, and cooling the activated charcoal out of contact with the atmosphere.

20. A carbonaceous adsorbent produced from a mixture of wood flour and charcoal fines wetted with a solution of zinc chloride and a carbonaceous binder, dried, compressed into briquettes, and heated until thoroughly carbonized.

In testimony whereof I affix my signature.

MAURICE E. BARKER.